(12) United States Patent
Mullen-Schultz

(10) Patent No.: US 6,356,924 B2
(45) Date of Patent: Mar. 12, 2002

(54) CONFIGURABLE DISABLEMENT OF DISPLAY OBJECTS IN A BROWSER

(75) Inventor: Gary Lee Mullen-Schultz, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/979,133

(22) Filed: Nov. 26, 1997

(51) Int. Cl.[7] .......................... G06F 15/00; G06F 17/30
(52) U.S. Cl. .................... 707/539; 707/526; 707/10; 707/102
(58) Field of Search ..................... 707/10, 102, 104, 707/513, 500, 501, 512, 526, 539; 345/112, 339, 348, 333, 334, 533

(56) References Cited

U.S. PATENT DOCUMENTS

| | | | | |
|---|---|---|---|---|
| 5,339,389 A | | 8/1994 | Bates et al. .................. 345/331 |
| 5,826,025 A | * | 10/1998 | Gramlich .................... 709/217 |
| 5,835,722 A | | 11/1998 | Bradshaw et al. ..... 395/200.55 |
| 5,845,084 A | | 12/1998 | Cordell et al. ......... 395/200.64 |
| 5,848,418 A | | 12/1998 | de Souza et al. ........... 707/102 |
| 5,860,074 A | * | 1/1999 | Rowe et al. ................ 707/526 |
| 5,862,325 A | | 1/1999 | Reed et al. ............ 395/200.31 |
| 5,870,559 A | | 2/1999 | Leshem et al. ........ 395/200.54 |
| 5,884,033 A | * | 3/1999 | Duvall et al. ............... 709/206 |
| 5,890,164 A | * | 3/1999 | Nielsen ....................... 707/201 |
| 5,890,172 A | | 3/1999 | Borman et al. ............. 707/501 |
| 5,893,109 A | | 4/1999 | DeRose et al. ............. 707/104 |
| 5,896,502 A | | 4/1999 | Shieh et al. ........... 395/200.54 |
| 5,907,681 A | * | 5/1999 | Bates et al. ............ 395/200.58 |
| 5,918,224 A | * | 6/1999 | Bredenberg .................... 707/2 |
| 5,918,237 A | * | 6/1999 | Montalbano ................ 707/513 |
| 5,930,808 A | | 7/1999 | Yamanaka et al. .......... 707/501 |
| 5,959,623 A | * | 9/1999 | Van Hoff et al. ........... 345/333 |
| 5,987,504 A | | 11/1999 | Toga ........................... 709/206 |
| 6,032,182 A | | 2/2000 | Mullen-Schultz ........... 709/223 |
| 6,088,717 A | | 7/2000 | Reed et al. .................. 709/201 |
| 6,122,657 A | * | 9/2000 | Hoffman, Jr. et al. ...... 709/201 |
| 6,226,642 B1 | | 5/2001 | Beranek et al. ............... 707/10 |

FOREIGN PATENT DOCUMENTS

| | | | | |
|---|---|---|---|---|
| EP | 0451384 | 10/1991 | ......... G06F/15/419 |
| EP | 0903677 | 3/1999 | ............ G06F/17/30 |

\* cited by examiner

Primary Examiner—Jean R. Homere
Assistant Examiner—Greta L. Robinson
(74) Attorney, Agent, or Firm—Owen J. Gamon; Roy W. Truelson

(57) ABSTRACT

A browser selectively disables the display of viewable objects in a document. The document contains control tags that describe how associated data is to be displayed. A browser interprets the control tags and formats the associated data to display viewable objects on a display-screen. The user selects a portion of the display screen, containing viewable objects, that the user desires to be blocked. In response to this selection, the browser saves a description of the user-selected area. When the browser subsequently retrieves the document, the browser compares the saved description to locations on the display screen associated with the control tags in the document. When the viewable object associated with a compared control tag is outside the saved description, the browser downloads and displays the viewable object. When the viewable object associated with the compared control tag is within the saved description, the browser blocks the display of the viewable object by not downloading the object and by blanking the screen at that location or by replacing the viewable object with an icon. In this way, the user can select which objects are downloaded and visible on the screen and which are not.

22 Claims, 15 Drawing Sheets

```
Page

<!DOCTYPE HTML PUBLIC "-//IETF//DTD HTML//EN">
<html>

<head>

...

<title>This is a Title</title>
</head>
<body bgcolor="#FFFFFF">

...

<p>This is an image:</p>
<p><img src="Lottery.gif" width="24" height="25"></p>    815

...

<p>This is an applet:</p>
<p><applet code="Freegift.class" width="256" height="128"></applet></p>   810

...
```

A

CONFIGURABLE DISABLEMENT OF DISPLAY OBJECTS IN A BROWSER

CROSS-REFERENCE TO RELATED APPLICATIONS

This application is related to application Ser. No. 08/979,132 filed Nov. 26, 1997.

FIELD OF THE INVENTION

The present invention relates in general to information processing systems. In particular, the present invention relates to networks in which information processing systems are utilized. Still more particularly, the present invention relates to a browser method and system for displaying information from a network.

BACKGROUND

The development of computerized distributed information resources, such as the "Internet," allows users to link to a computer network and retrieve vast amounts of electronic information previously unavailable in an electronic medium. Such electronic information increasingly is displacing more conventional means of information transmission, such as newspapers, rnagazines, and even television.

Electronic information transferred between computer networks (e.g., the Internet) can be presented to a user in hypertext, a metaphor for presenting information in a manner in which text, images, sounds, and actions become linked together in a complex, non-sequential web of associations that permit the user to "browse" through related topics, regardless of the presented order of the topics. For example, traveling among links to the word "iron" in an article displayed within a graphical user interface in a computer system might lead the user to the periodic table of the chemical elements (i.e., linked by the word "iron"), or to a reference to the use of iron in weapons in Europe in the Dark Ages. The term "hypertext" is used to describe documents, as presented by a computer, that express the nonlinear structure of ideas, as opposed to the linear format of books, film, and speech. The combination of hypertext documents connected by their links in the Internet is referred to as the World Wide Web (WWW).

Networked systems utilizing hypertext conventions typically follow a client/server architecture. A "client" is usually a computer that requests a service provided by another computer (i.e., a server). A "server" is typically a remote computer system accessible over a communications medium such as the Internet. Based upon such requests by the user at the client, the server presents information to the user as responses to the client. The client typically contains a program, called a browser, that communicates the requests to the server and formats the responses for viewing (browsing) at the client.

The browser retrieves a web page from the server and displays it to the user at the client. A "web page" (also referred to by some designers simply as a "page") is a data file, or document, written in a hyper-text language that may have viewable objects such as text, graphic images, and even multimedia objects, such as sound recordings or moving video clips associated with that data file.

When a client workstation sends a request to a server for a web page, the server first transmits (at least partially) the main hypertext file associated with the web page, and then loads, either sequentially or simultaneously, the other files associated with the web page. The constructed web page is then displayed on a client display screen. A web page may be larger than the physical size of the display screen, and devices such as graphical user interface scroll bars can be utilized by the viewing software (i.e., the browser) to view different portions of the web page.

Many web pages are filled with numerous viewable objects, drastically increasing download time from the server to the client. Some of these viewable objects are important and interesting; for example, a navigation bar. Others are more likely to be annoying to the user; an example is advertisements. Current browsers allow the user to configure that either all viewable objects are downloaded, or none at all. This "all or nothing" approach does not provide the user with an acceptable solution to managing downloaded web pages.

From the foregoing, it can be seen that a need exists for a method and system for managing viewable objects in downloaded web pages.

SUMMARY OF THE INVENTION

It is therefore one object of the present invention to provide for an improved browser method and system.

It is therefore another object of the present invention to provide an improved information processing system.

It is still another object of the present invention to provide to a method and system for selectively disabling the display of viewable objects.

In the preferred embodiment, a browser selectively disables the display of viewable objects in a document. The document contains control tags that describe how associated data is to be displayed. A browser interprets the control tags and formats the associated data to display viewable objects on a display-screen. The user selects a portion of the display screen, containing viewable objects, that the user desires to be blocked. In response to this selection, the browser saves a description of the user-selected area.

When the browser subsequently retrieves the document, the browser compares the saved description to locations on the display screen associated with the control tags in the document. When the viewable object associated with a compared control tag is outside the saved description, the browser downloads and displays the viewable object. When the viewable object associated with the compared control tag is within the saved description, the browser blocks the display of the viewable object by not downloading the object and by blanking the screen at that location or by replacing the viewable object with an icon. In this way, the user can select which objects are downloaded and visible on the screen and which are not.

BRIEF DESCRIPTION OF THE DRAWINGS

FIG. 7c is a pictorial representation of a display screen after the operation of the preferred embodiment.

DESCRIPTION OF THE PREFERRED EMBODIMENT

Technology Overview

Figure 1:
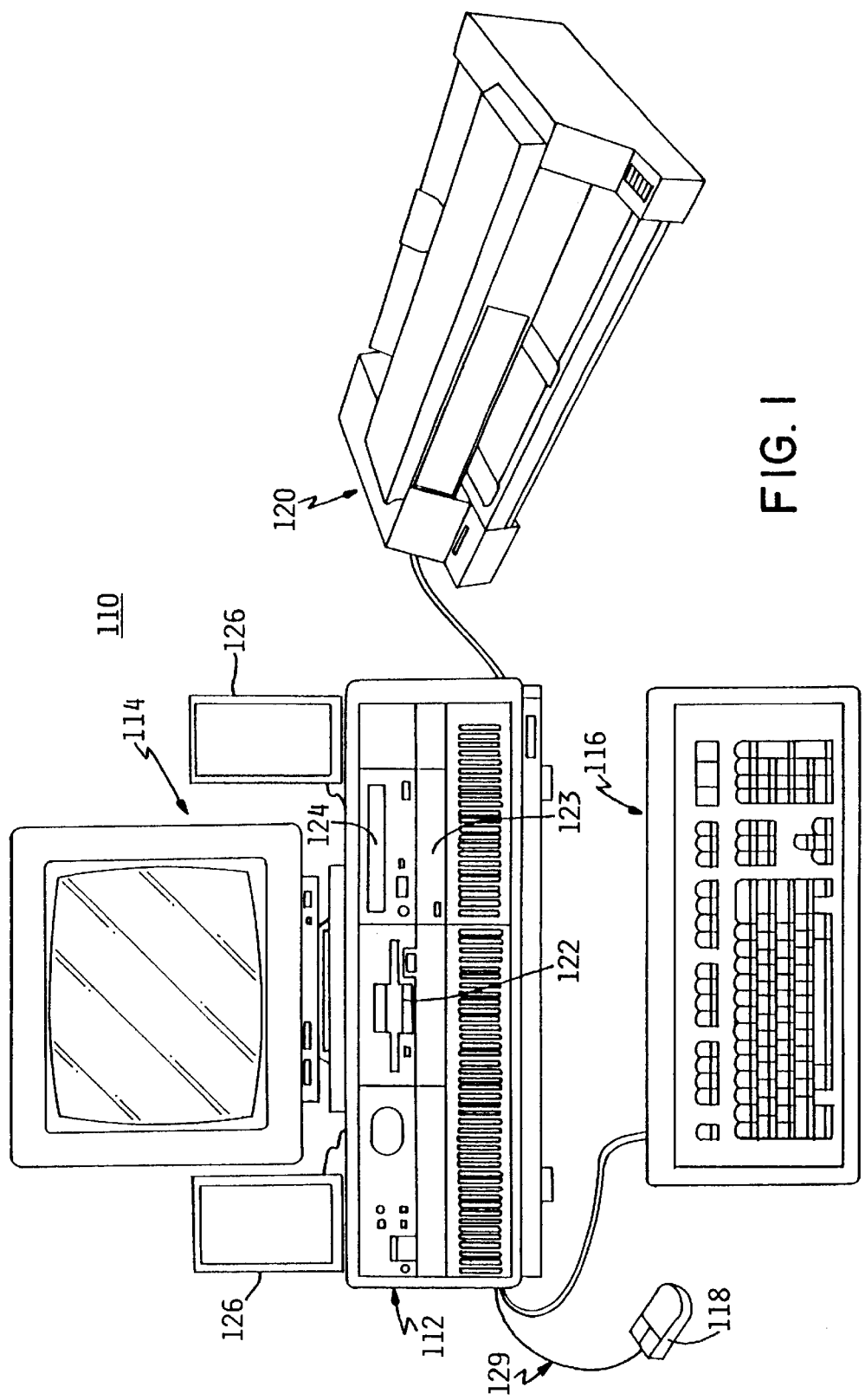
FIG. 1 is a pictorial representation of a computer system that may be utilized to implement a preferred embodiment of the present invention.

The development of computerized distributed information resources, such as the "Internet," allows users to link with servers and networks, and thus retrieve vast amounts of electronic information heretofore unavailable in an electronic medium. Such electronic information increasingly is displacing more conventional means of information transmission, such as newspapers, magazines, and even television. The term "Internet" is an abbreviation for "Internetwork," and refers commonly to a collection of computer networks that utilize the TCP/IP suite of protocols, well-known in the art of computer networking. TCP/IP is an acronym for "Transport Control Protocol/Internet Protocol," a software protocol developed by the Department of Defense for facilitating communications between computers.

Electronic information transferred between computer networks (e.g., the Internet) can be presented to a user in hypertext, a metaphor for presenting information in a manner in which text, images, sounds, and actions become linked together in a complex non-sequential web of associations that permit the user to "browse" through related topics, regardless of the presented order of the topics. These links are often established by both the author of a hypertext document and by the user, depending on the intent of the hypertext document. For example, traveling among links to the word "iron" in an article displayed within a graphical user interface in a computer system might lead the user to the periodic table of the chemical elements (i.e., linked by the word "iron"), or to a reference to the use of iron in weapons in Europe in the Dark Ages. The term "hypertext" is utilized to describe documents, as presented by a computer, that express the nonlinear structure of ideas, as opposed to the linear format of books, film, and speech.

Hypertext, especially in an interactive format where choices are controlled by the user, is structured around the idea of offering a working and learning environment that parallels human thinking—that is, an environment that allows the user to make associations between topics rather than moving sequentially from one topic to the next, as in an alphabetic list. Hypertext topics are linked in a manner that allows users to jump from one subject to other related subjects during a search for information.

Networked systems utilizing hypertext conventions typically follow a client/server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without having to know any working details about the other program or the service itself. In networked systems, a client is usually a computer that accesses shared network resources provided by another computer (i.e., a server).

A "server" is typically a remote computer system accessible over a communications medium such as the Internet. The server scans and searches for raw (e.g., unprocessed) information sources (e.g., newswire feeds or newsgroups). Based upon such requests by the user, the server presents filtered electronic information to the user as server responses to the client process. The client process may be active in a first computer system, and the server process may be active in a second computer system, and communicate with one another over a communications medium that allows multiple clients to take advantage of the information-gathering capabilities of the server. A server can thus be described as a network computer that runs administrative software that controls access to all or part of the network and its resources, such as disk drivers or printers. A computer acting as a server makes resources available to computers acting as workstations on the network.

Client and server can communicate with one another utilizing the functionality provided by a hypertext transfer protocol (HTTP). The World Wide Web (WWW) or, simply, the "web," includes all servers adhering to this protocol, which are accessible to clients via a Universal Resource Locator (URL). Internet services can be accessed by specifying Universal Resource Locators that have two basic components: a protocol to be used and an object pathname. For example, the Universal Resource Locator address, "http://www.uspto.gov" (i.e., the "home page" for the U.S. Patent and Trademark Office), specifies a hypertext transfer protocol ("http") and a pathname ("www.uspto.gov") of the server. The server name is associated with a unique numeric value (i.e., a TCP/IP address). Active within the client is a first process, known as a "browser" that establishes the connection with the server and presents information to the user. The server itself executes corresponding server software that presents information to the client in the form of HTTP responses. The HTTP responses correspond to "web pages" constructed from a Hypertext Markup Language (HTML), or other server-generated data.

A "web page" (also referred to by some designers simply as a "page" or a "document") is a data file written in a hyper-text language, such as HTML, that may have text, graphic images, Java applets, ActiveX controls, and even multimedia objects, such as sound recordings or moving video clips associated with that data file. The page contains control tags and data. The control tags identify the structure; for example, the headings, subheadings, paragraphs, lists, and embedding of images. The data consists of the contents, such as text or multimedia, that will be displayed or played to the user. A browser interprets the control tags and formats the data according to the structure specified by the control tags to create viewable objects that the browser displays, plays, or otherwise performs to the user. The data that the browser formats can be contained within the page, or it can be in another file on the same or a different server and embedded into the page. Thus, a control tag can direct the browser to retrieve a page from another source and place it at the location specified by the control tag. In this way, the browser can build a viewable object that contains multiple components, such as spreadsheets, text, hotlinks, pictures, sound, and video objects. A web page can be constructed by loading one or more separate files into an active directory or file structure that is then displayed as viewable objects within a graphical user interface.

When a client workstation sends a request to a server for a web page, the server first transmits (at least partially) the main hypertext file associated with the web page, and then loads, either sequentially or simultaneously, the other files associated with the web page. A given file may be transmitted as several separate pieces via TCP/IP protocol. The constructed web page is then displayed as a viewable object on the workstation monitor. A web page may be "larger" than the physical size of the monitor screen, and devices such as graphical user interface scroll bars can be utilized by the viewing software (i.e., the browser) to view different portions of the web page.

As various pages are visited via hypertext links displayed within a web browser, URLs representative of the pages visited during a given web navigation session are typically recorded by the web browser. Because the number of pages is enormous, a user searching for particular or important pages can find it difficult to find those particular or important pages. Navigating through existing pages can be a time consuming task, and often important pages are not visited. Many current browsers provide the user with a "bookmark" list, also known as a "favorites" list. This bookmark list stores favorite URL's of the user. When the user browses a page that the user would like to browse again, the user can save the URL for that page in the bookmark list. In the future, when the user wishes to browse that page again, the user selects the page from the bookmark list, which frees the user from having to remember the URL.

Detailed Description

With reference now to the figures and in particular with reference to FIG. 1, there is depicted an embodiment of a computer system that may be utilized to implement the preferred embodiment. Computer system 110 includes processing unit 112, display device 114, keyboard 116, pointing device 118, printer 120, and speakers 126. Processing unit 112 receives input data from input devices such as keyboard 116, pointing device 118, and local area network interfaces (not illustrated) and presents output data to a user via display device 114, printer 120, and speakers 126. Pointing device 118 is preferably utilized in conjunction with a graphical user interface (GUI) in which hardware components and software objects are controlled through the selection and the manipulation of associated graphical objects displayed within display device 114. Although computer system 110 is illustrated with a mouse for pointing device 118, other graphical-pointing devices such as a graphic tablet, joystick, track ball, or track pad could also be utilized.

Keyboard 116 is that part of computer system 110 that resembles a typewriter keyboard and that enables a user to control particular aspects of the computer. Because information flows in one direction, from keyboard 114 to processing unit 112, keyboard 116 functions as an input-only device. Functionally, keyboard 116 represents half of a complete input/output device, the output half being video display terminal 114. Keyboard 116 includes a standard set of printable characters presented in a QWERTY pattern typical of most typewriters. In addition, keyboard 116 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video-display terminal 114.

Video-display terminal 114 is the visual output of computer system 110. As indicated herein, video-display terminal 114 can be a cathode-ray tube (CRT) based video display well-known in the art of computer hardware. But, with a portable or notebook-based computer, video display terminal 114 can be replaced with a liquid crystal display (LCD) based or gas, plasma-based, flat-panel display.

Pointing device 118 features a casing with a flat bottom that can be gripped by a human hand. Pointing device 118 can include buttons on the top, a multidirectional detection device such as a ball on the bottom, and a cable 129 that connects pointing device 118 to processing unit 112.

Computer system 110 can be implemented utilizing any suitable computer such as the IBM Aptiva computer, a product of International Business Machines Corporation, located in Armonk, N.Y. But, a preferred embodiment of the present invention can apply to any hardware configuration that allows browsing of documents, regardless of whether the computer system is a complicated, multi-user computing apparatus or a single-user workstation. Computer system 110 is thus a configuration that includes all functional components of a computer and its associated hardware. In general, a typical computer system includes a console or processing unit such as processing unit 112, with one or more disk drives, a monitor such as video display terminal 114, and a keyboard such as keyboard 116.

To support storage and retrieval of data, processing unit 112 further includes diskette drive 122, hard-disk drive 123, and CD-ROM drive 124, which are interconnected with other components of processing unit 112.

Figure 2:
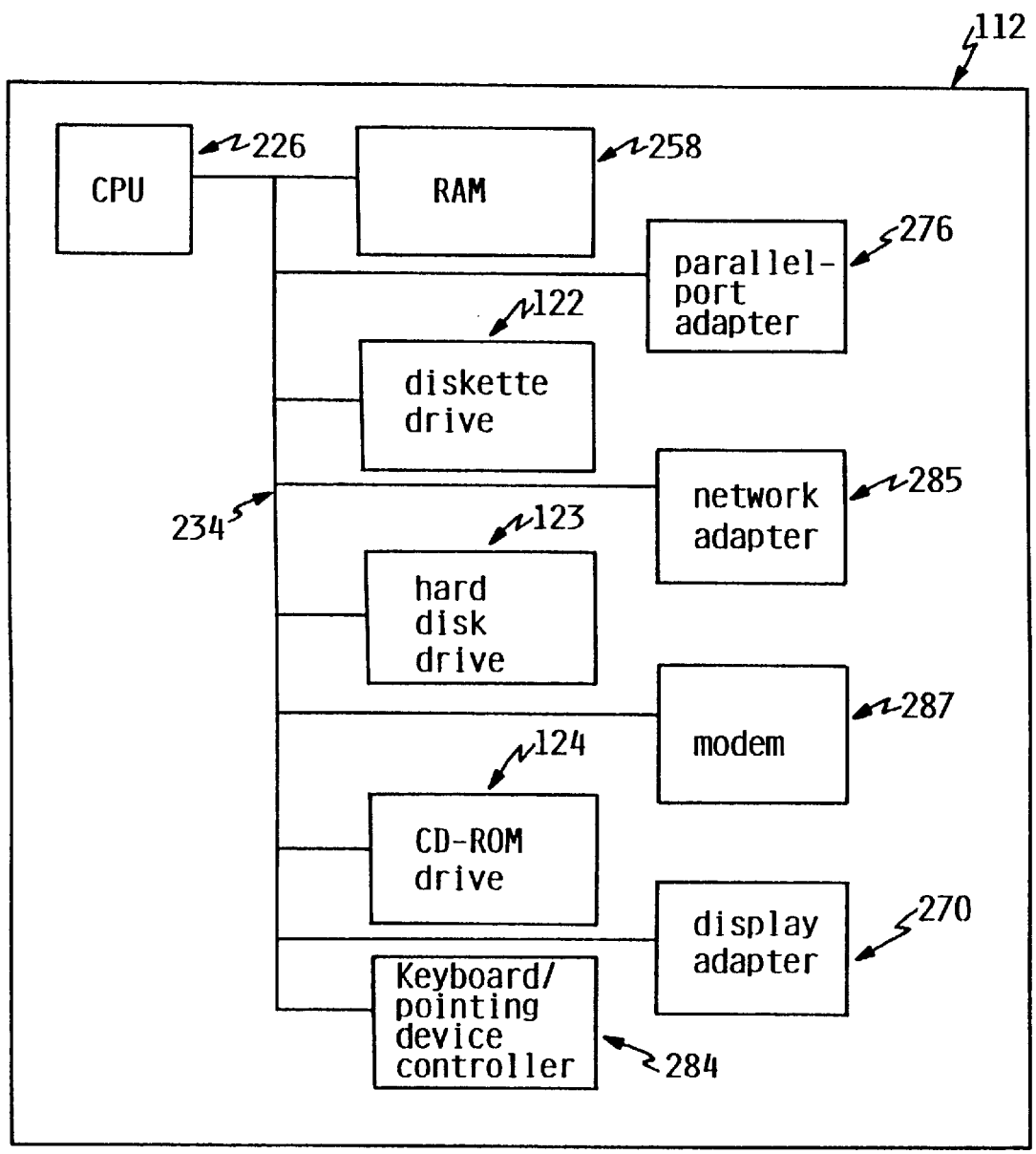
FIG. 2 is a block diagram of a representative hardware environment of the processing unit of the computer system illustrated in FIG. 1.

Referring to FIG. 2, there is depicted a block diagram of the principal components of processing unit 112. CPU 226 is connected via system bus 234 to RAM 258, diskette drive 122, hard-disk drive 123, CD-ROM drive 124, keyboard/pointing-device controller 284, parallel-port adapter 276, network adapter 285, display adapter 270, and modem 287. Although the various components of FIG. 2 are drawn as single entities, each may consist of a plurality of entities and may exist at multiple levels.

Processing unit 112 includes central processing unit (CPU) 226, which executes instructions. CPU 226 includes the portion of computer system 110 that controls the operation of the entire computer system, including executing the arithmetical and logical functions contained in a particular computer program. Although not depicted in FIG. 2, CPUs such as CPU 226 typically include a control unit that organizes data and program storage in a computer memory and transfers the data and other information between the various parts of the computer system. Such CPUs also generally include an arithmetic unit that executes the arithmetical and logical operations, such as addition, comparison, multiplication, and so forth. CPU 226 accesses data and instructions from and stores data to volatile random access memory (RAM) 258.

While any appropriate processor can be utilized for CPU 226, it is preferably one of the Power PC line of microprocessors available from IBM. Alternatively, CPU 226 can be implemented as one of the 80×86 or Pentium processors, or any other type of processor, which are available from a number of vendors. Although computer system 110 is shown to contain only a single CPU and a single system bus, it should be understood that the present invention applies equally to computer systems that have multiple CPUs and to computer systems that have multiple buses that each perform different functions in different ways.

RAM 258 comprises a number of individual volatile memory modules that store segments of operating system and application software while power is supplied to computer system 110. The software segments are partitioned into one or more virtual memory pages that each contain a uniform number of virtual memory addresses. When the execution of software requires more pages of virtual memory that can be stored within RAM 258, pages that are not currently needed are swapped with the required pages, which are stored within non-volatile storage devices 122, 123, or 124. RAM 258 is a type of memory designed such that the location of data stored in it is independent of the content. Also, any location in RAM 258 can be accessed directly without having to work through from the beginning.

Hard disk drive 123 and diskette drive 122 are electro-mechanical devices that read from and write to disks. The main components a disk drive in particular can include are a spindle that mounts a disk, a drive motor that spins the disk when the drive is in operation, one or more read/write heads that perform the actual reading and writing, a second motor that positions the read/write heads over the disk, and controller circuitry that synchronizes read/write activities and transfers information to and from computer system 110. A disk itself is typically a round, flat piece of flexible plastic (e.g., floppy disk) or inflexible metal (e.g. hard disk) coated with a magnetic material that can be electrically influenced to hold information recorded in digital (i.e., binary) form A disk is, in most computers, the primary method for storing data on a permanent or semipermanent basis. Because the magnetic coating of the disk must be protected from damage and contamination, a floppy (e.g., 5.25 inch) disk or microfloppy (e.g., 3.5 inch) disk is encased in a protective plastic jacket. A hard disk, which is very finely machined, is typically enclosed in a rigid case and can be exposed only in a dust-free environment.

Keyboard/pointing-device controller 284 interfaces processing unit 112 with keyboard 116 and graphical-pointing device 118. In an alternative embodiment, there is a separate controller for keyboard 116 and graphical-pointing device 118.

Display adapter 270 translates graphics data from CPU 226 into video signals utilized to drive display device 114.

Finally, processing unit 112 includes network adapter 285, modem 287, and parallel-port adapter 276, which facilitate communication between computer system 110 and peripheral devices or other computer systems. Parallel-port adapter 276 transmits printer-control signals to printer 120 through a parallel port. Network adapter 285 connects computer system 110 to an unillustrated local area network (LAN). A LAN provides a user of computer system 110 with a means of electronically communicating information, including software, with a remote computer or a network logical-storage device. In addition, a LAN supports distributed processing, which enables computer system 110 to share a task with other computer systems linked to the LAN.

Modem 287 supports communication between computer system 110 and another computer system over a standard telephone line. Furthermore, through modem 287, computer system 110 can access other sources such as a server, an electronic bulletin board, and the Internet or World Wide Web.

The configuration depicted in FIG. 1 is but one possible implementation of the components depicted in FIG. 2. Portable and "laptop" based computers are other possible configurations. The hardware depicted in FIG. 2 may vary for specific applications. For example, other peripheral devices such as optical-disk media, audio adapters, or chip-programming devices, such as PAL or EPROM programming devices well-known in the art of computer hardware and the like, may be utilized in addition to or in place of the hardware already depicted.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (a) information permanently stored on non-writable storage media (e.g., read only memory devices within a computer such as CD-ROM disks readable by CD-ROM drive 124); (b) alterable information stored on writable storage media (e.g., floppy disks within diskette drive 122 or hard-disk drive 123); or (c) information conveyed to a computer by a communications media, such as through a computer or telephone network, including wireless communications. Such signal-bearing media, when carrying computer-readable instructions that direct the functions of the present invention, represent alternative embodiments of the present invention.

Figure 3:
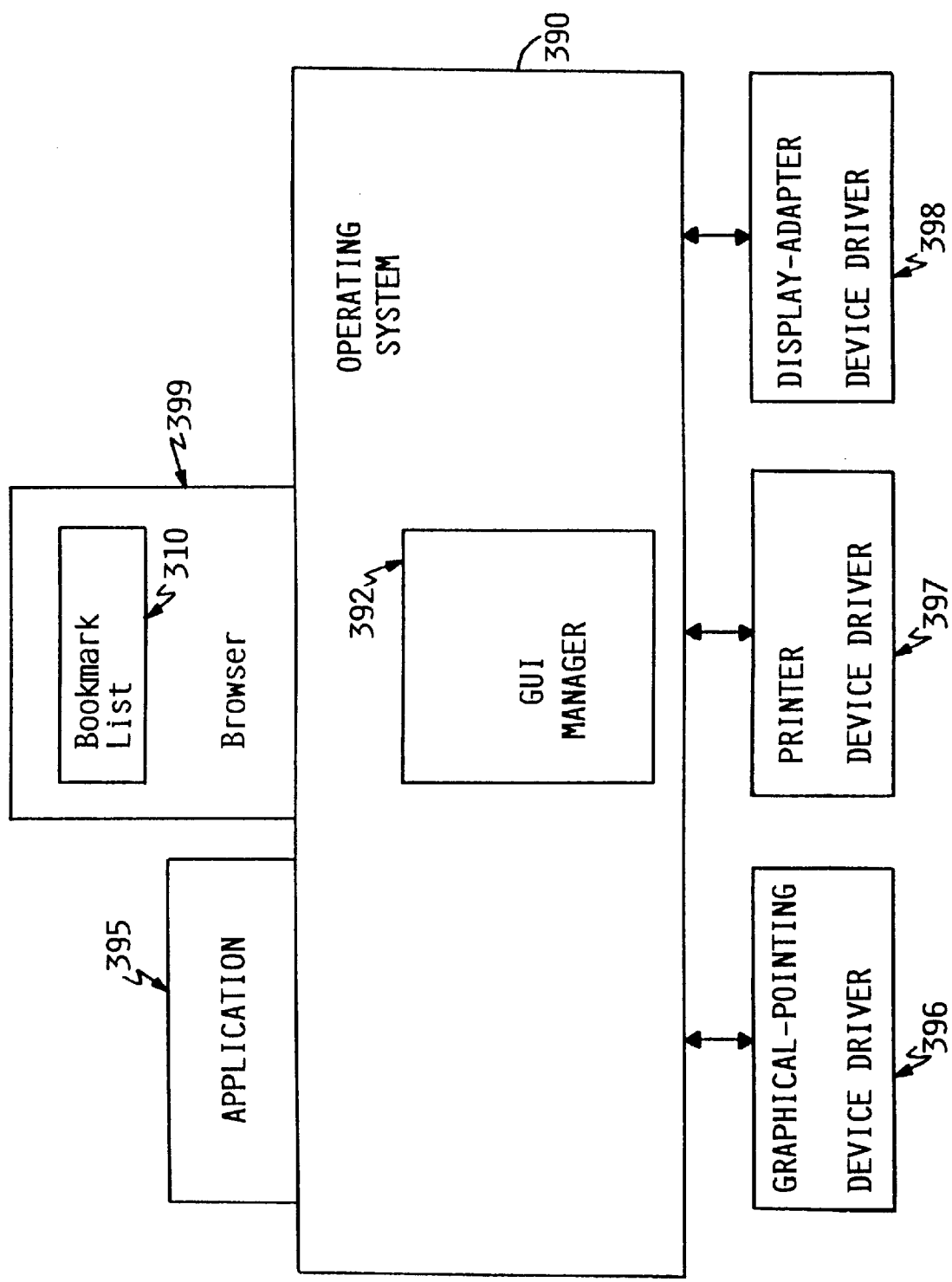
FIG. 3 is a block diagram of software stored within the memory of the computer system depicted in FIG. 1.

With reference now to FIG. 3, there is illustrated a block-diagram representation of the software configuration of computer system 110 in accordance with the preferred embodiment. As noted above, the software executed by computer system 110 can be stored within one or more of RAM 258, the nonvolatile storage provided by diskette drive 122, hard-disk drive 123, CD-ROM drive 124, or a remote server accessible via modem 287 or network adapter 285.

As illustrated, the software configuration of computer system 110 includes operating system 390, which is responsible for directing the operation of computer system 110. For example, operating systems typically include computer software for controlling the allocation and usage of hardware resources such as memory, CPU time, disk space, and peripheral devices. A suitable operating system 390 and associated graphical-user-interface manager 392 (e.g., Microsoft Windows, AIX, or OS/2) could be used. Other technologies also could be utilized, such as touch-screen technology or human-voice control. The operating system is the foundation upon which applications 395, such word-processing, spreadsheet, and web browser programs are built.

In accordance with the preferred embodiment, operating system 390 includes graphical-user-interface (GUI) manager 392 although they could be packaged separately. GUI 392 manages the graphical-user-interface with which a user of computer 110 interacts.

Operating system 390 communicates with applications 395 and browser 399 through messages conforming to the syntax of the application-program-interface (API) supported by operating system 390. Operating system 390 further communicates with graphical-pointing device-driver 396, printer device-driver 397, and display-adapter device-driver 398. For example, operating system 390 sends graphics data to display-adapter device-driver 398, which in turn translates the messages into bus signals utilized to control display adapter 270. In addition, graphical-pointing device-driver 396 translates signals from pointing device 118 through keyboard/pointing-device controller 284 into Cartesian coordinates and a selection status, which are then relayed to GUI manager 392.

CPU 226 is suitably programmed to carry out the preferred embodiment by browser 399, as described in more detail in the flowcharts of FIGS. 9–12. In the alternative, the function of FIGS. 9–12 could be implemented by control circuitry through the use of logic gates, programmable-logic devices, or other hardware components in lieu of a processor-based system.

Browser 399 includes bookmark list 310, which is further described under the description for FIG. 8, below. In an alternative embodiment, bookmark list 310 could be packaged separately from browser 399. Although browser 399 is drawn as being separate from operating system 390, they could be packaged together.

Figure 4:
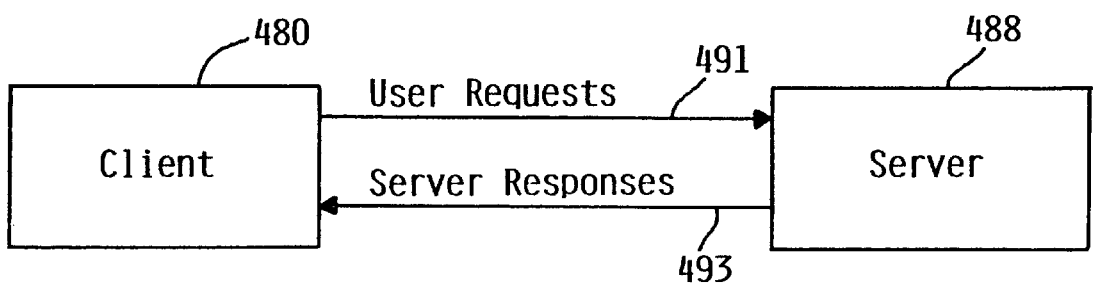
FIG. 4 is a block diagram illustrative of a client/server architecture in accordance with a preferred embodiment of the present invention.

FIG. 4 illustrates a block diagram of a client/server architecture, in accordance with a preferred embodiment. User requests 491 are sent by client process 480 to server 488. Server 488 can be a remote computer system accessible over a computerized, distributed-information resource such as the Internet or other communications network. Server 488 performs scanning and searching of information sources and, based upon these user requests, presents the filtered electronic information as server responses 493 to the client process. The client process may be active in a first computer system, and the server process may be active in a second computer system, communicating with one another over a communications medium, thus providing distributed functionality and allowing multiple clients to take advantage of the information-gathering capabilities of the server.

Figure 5:
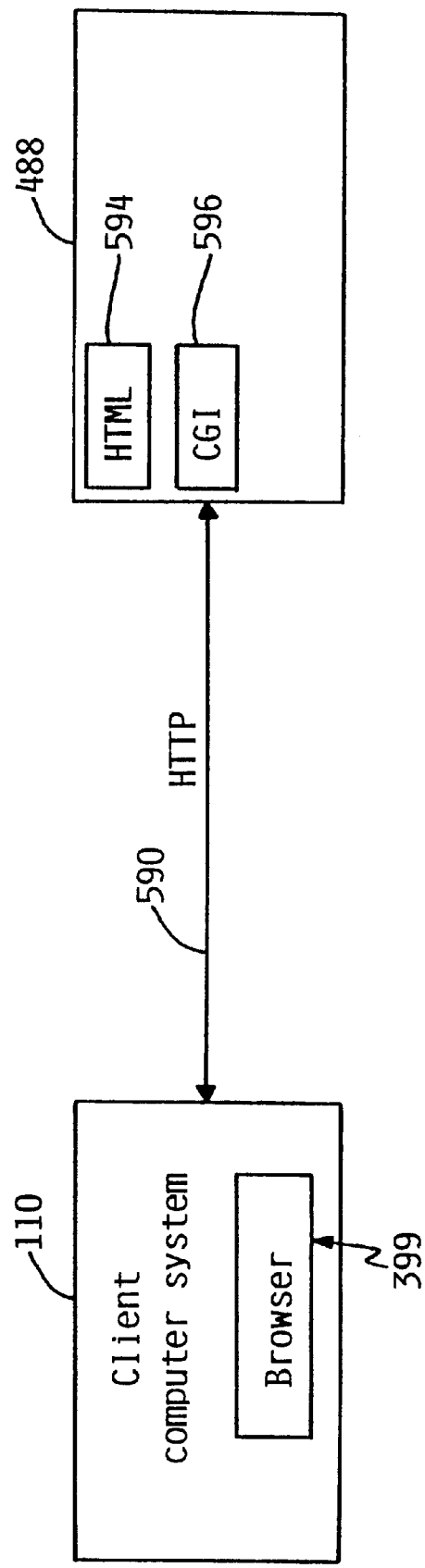
FIG. 5 is a detailed block diagram of a client/server architecture in accordance with a preferred embodiment of the present invention.

FIG. 5 illustrates a detailed block diagram of a client/server architecture in accordance with a preferred embodiment of the present invention. Although the client and server are processes that are operative within two computer systems, these processes being generated from a high-level programming language (e.g., PERL), which is interpreted and executed in a computer system at runtime (e.g., a workstation), they could be implemented in a variety of hardware devices, either programmed or dedicated.

Computer system 110, functioning as a client, and server 488 communicate by utilizing the functionality provided by HTTP. Active within client 110 is a first process, browser 399, which establishes connections with server 488 and presents information to the user.

Server 488 executes the corresponding server software, which presents information to the client in the form of HTTP responses 590. The HTTP responses 590 correspond with the web pages represented using HTML or other data generated by server 488. Server 488 provides HTML 594. Server 488 also provides Common Gateway Interface (CGI) 596, which allows client 110 to direct server 488 to commence execution of a specified program contained within server 488. This may include a search engine that scans received information in the server for presentation to the user controlling the client. Using this interface and HTTP responses 590, the server can notify the client of the results of that execution upon completion.

Figure 6:
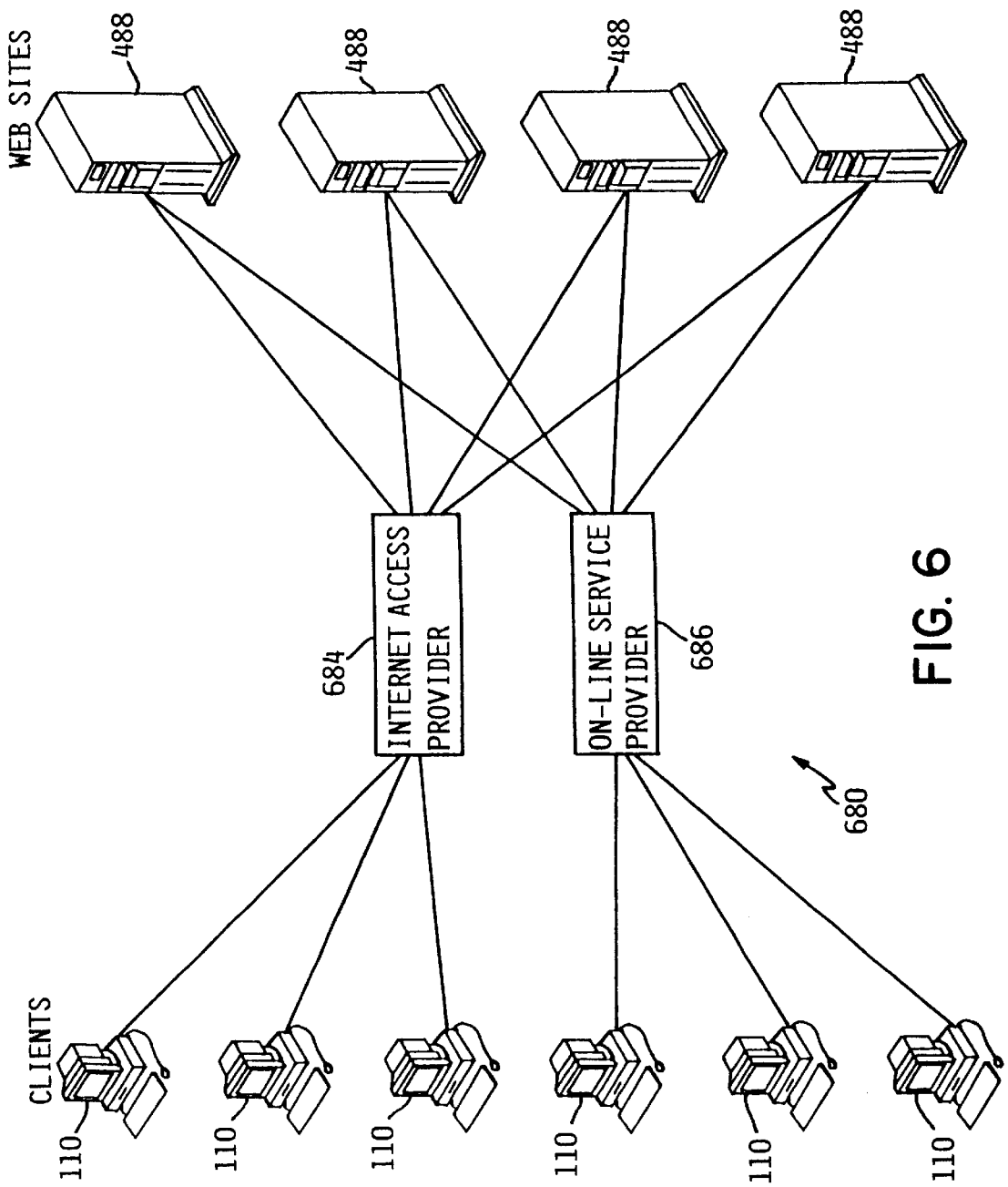
FIG. 6 is a diagram illustrative of a computer network that can be implemented in accordance with a preferred embodiment of the present invention.

FIG. 6 is a diagram illustrative of a computer network 680, which can be implemented in accordance with a preferred embodiment of the present invention. Computer network 680 is representative of the Internet, which can be described as a known computer network based on the client-server model discussed herein. Conceptually, the Internet includes a large network of servers 488 that is accessible by clients 110, typically users of personal computers and previously described above under the description for FIGS. 1 and 2. Clients 110 access the network of servers 488 through private Internet access provider 684 (e.g., Internet America) or an on-line service provider 686 (e.g., America On-Line, Prodigy, and Compuserve). Each of clients 110 may run browser 399 to access servers 488 via the access providers. Each server 488 operates a web site that supports files in the form of documents and pages. A network path to servers 488 is identified by a Universal Resource Locator (URL) having a known syntax for defining a network collection.

Figure 7A:
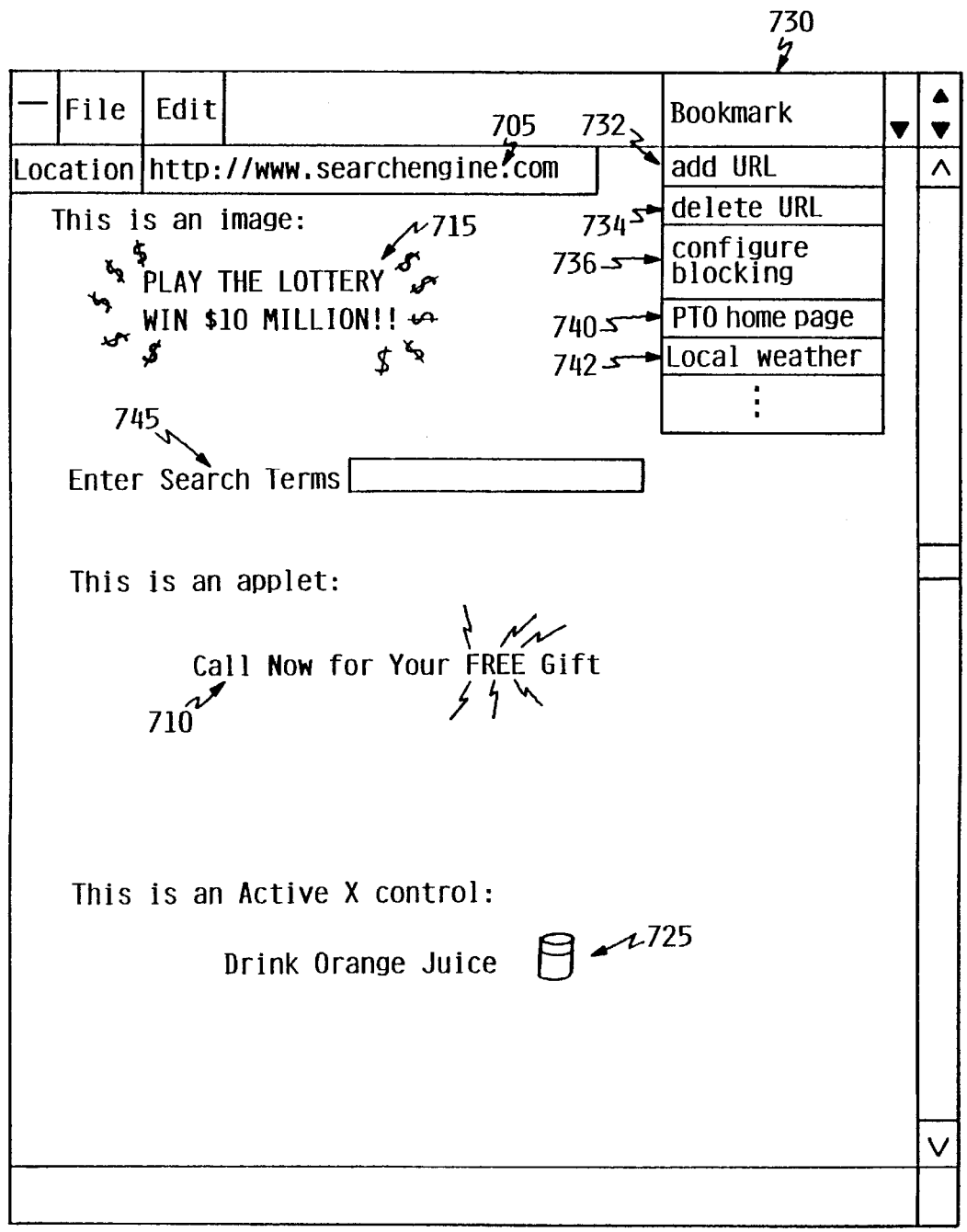
FIGS. 7a and 7b are pictorial representations of the interfaces that are used to control the operation of the preferred embodiment.

FIG. 7a illustrates a pictorial representation of example interfaces that are used to control the operations of the preferred embodiment. Bookmark control 730 is a pull-down menu that the user can access to control the operations of the preferred embodiment. Bookmark control 730 contains menu options "add URL" 732, "delete URL" 734, "configure blocking" 736, "PTO home page" 740, and "Local Weather" 742. Menu options 732, 734, and 736 are options that the user can access while menu options 740 and 742 are bookmarks, which when the user selects them, browser 399 will access their respective associated pages.

When the user selects "add URL" 732, browser 399 adds the current viewed page, for example URL 705, to bookmark list 310. By using menu options 732, the user previously added bookmarks 740 and 742.

Menu option "delete URL" 734 allows the user to request the removal of a bookmark from bookmark list 310.

Menu option "configure blocking" 736 allows the user to control the configuration of the blocking function. When the user selects menu option 736, browser 399 displays the example dialog shown in FIG. 7b, described below.

Referring again to FIG. 7a, the example page, which browser 399 downloaded from URL 705, contains viewable objects 715, 745, 710, and 725. Browser 399 creates these viewable objects by interpreting the control tags in the downloaded document and formatting data associated with the control tags, as further described below under the description for FIG. 8. Referring again to FIG. 7a, viewable object 715 was created from an image tag. Viewable object 710 was created from an applet tag. Viewable object 725 was created from a ActiveX control tag.

Figure 7B:
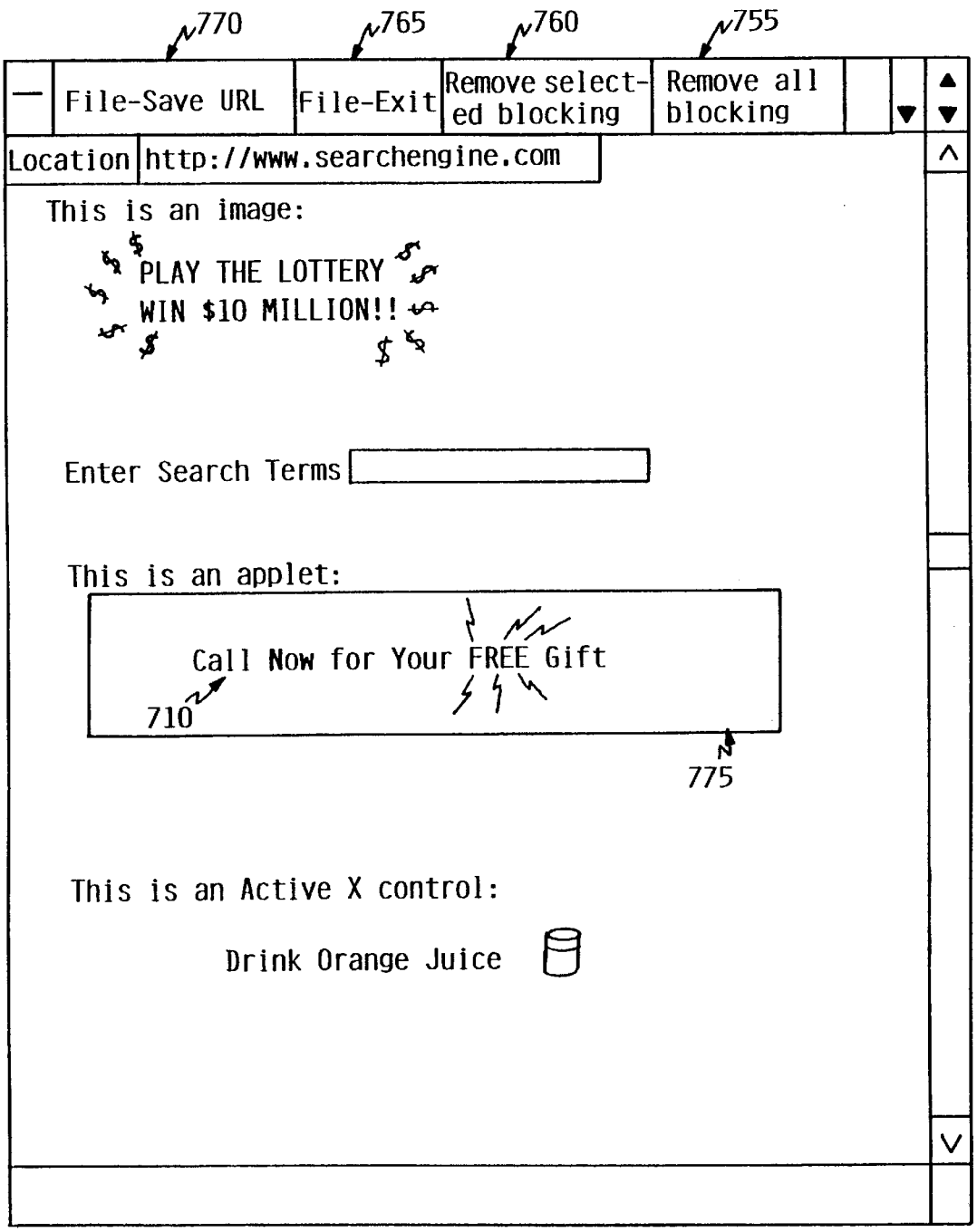

FIG. 7b depicts an example screen shown by browser 399 in response to the user selecting menu option 736, described above under the description for FIG. 7a. Referring again to FIG. 7b, the user may select control buttons file-save URL 770, file-exit 765, remove selected blocking 760, or remove all blocking 755. When the user draws rectangle 775 around the desired area of the screen to be blocked, in this example viewable object 710, and selects button 770, browser 399 will block the display of the data within the rectangle, as further described below under the description for FIGS. 7c, 10, and 11. If the URL associated with the displayed page does not already exist in bookmark list 310, then browser 399 will add a bookmark name and the URL, as further described below under the description for FIGS. 8 and 10. Although in this example, rectangle 775 is shown, other geometric shapes could also be used, such as a square, a circle, an oval, a triangle, or in general in a polygon. When the user selects button 765, browser 399 exits from the displayed screen and returns to the invoking screen, such as the one shown in FIG. 7a.

Referring again to FIG. 7b, when the user draws a polygon around a screen area and selects button 760, then browser 399 removes blocking for this selected area, as further described below under the description for FIG. 12.

Referring again to FIG. 7b, when the user selects button 755, browser 399 removes all of the blocking previously requested for the displayed web page, as further described below under the description for FIG. 12.

Figure 7C:
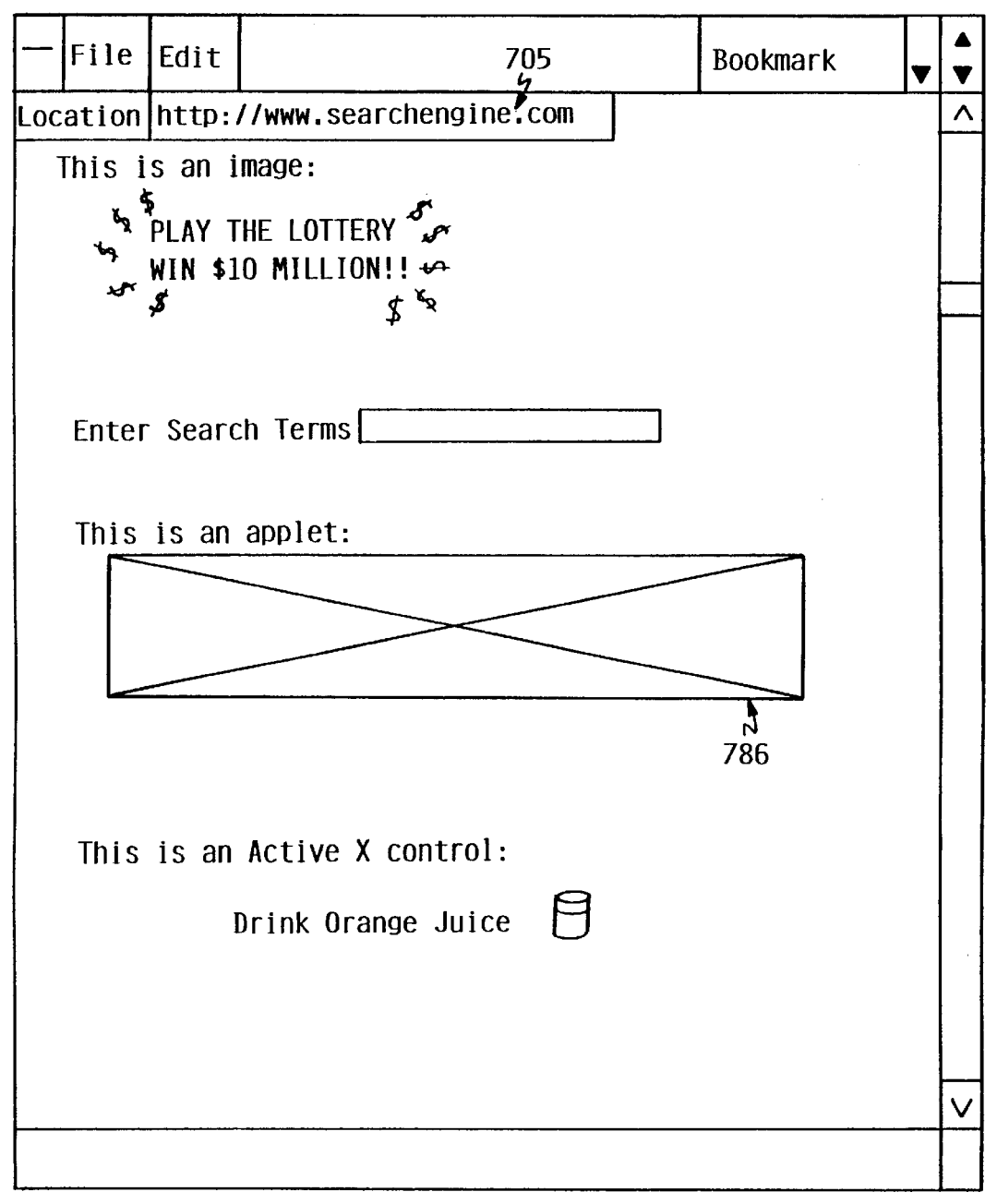

FIG. 7c illustrates a pictorial representation of a display screen after blocking the area defined by rectangle 775, according to the preferred embodiment. The user previously drew rectangle 775 around viewable object 710 and then selected file-save URL 770, as shown above under the description for FIG. 7b. Referring again to FIG. 7c, in response to the user's request, browser 399 added URL 705 to bookmark list 310 and displayed icon 786 indicating the location at which the applet would have been placed had it not been blocked.

Figure 8B:
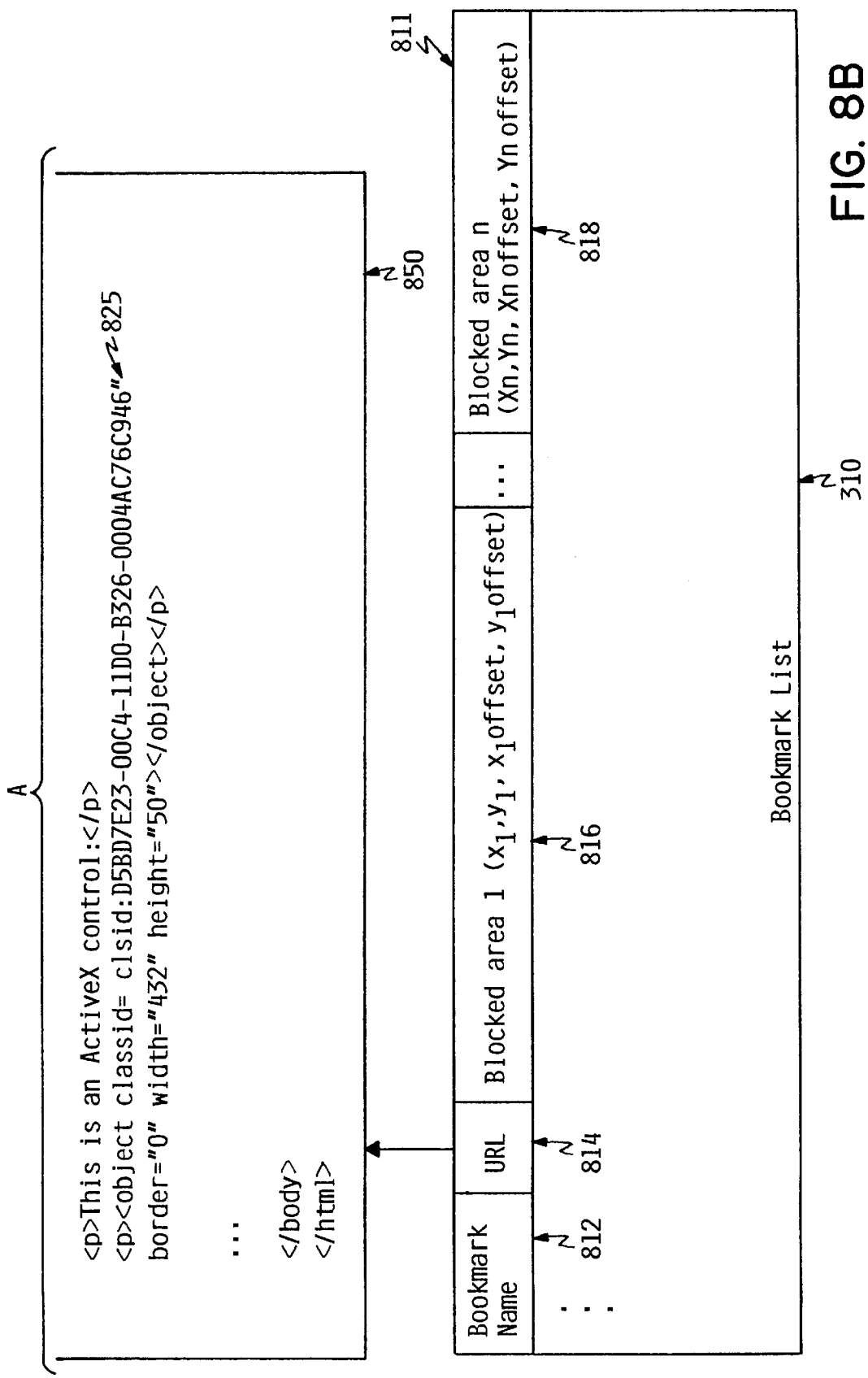
FIG. 8 is a block diagram of the data structures of the preferred embodiment.

FIG. 8 illustrates a block diagram of the data structures of the preferred embodiment. Page 850 represents a page (or document) in HTML format stored on a server and downloaded to the client in response to request from browser 399. Bookmark list 310 is a data structure maintained by browser 399.

Page 850 contains example HTML control tags that browser 399 interprets to display the sample viewable object on display screen 114 shown in FIG. 7*a*. Referring again to FIG. 8, tag 815, when interpreted by browser 399, causes browser 399 to download the file named "lottery.gif" from a server, format its data, and display viewable object 715, as previously described above under the description for FIG. 7*a*. Referring again to FIG. 8, tag 810, when interpreted by browser 399, causes browser 399 to download the applet "freegift.class" from a server and display viewable object 710, as previously described above under the description for FIG. 7*a*. Referring again to FIG. 8, tag 825, when interpreted by browser 399, causes browser 399 to display viewable object 725, as previously described above under the description for FIG. 7*a*.

Bookmark list 310 is the list against which the user operates via menu 730 shown in FIG. 7*a*. Referring again to FIG. 8, bookmark list 310 contains example bookmark entry 811. When the user draws a rectangle around the viewable object the user wishes to block and selects menu option 732, browser 399 assigns the current page being viewed a value for bookmark name 812 and stores the page URL, for example URL 705, in URL field 814. Browser 399 then stores a description of the selected display-screen area in blocked area 816, in the form of x and y coordinates of the upper left-hand corner of the rectangle along with the length of the rectangle on the x-axis and the height of the rectangle on the y-axis. Although the example coordinates in blocked area 816 are specific to a rectangle, the coordinates saved could also be modified to represent any polygon. Since the user can select multiple blocked areas, blocked-area field 816 through blocked-area field 818 are provided in entry 811 of bookmark list 310. Thus, in the preferred embodiment, bookmark list 310 contains the blocked display-areas, but any list that is capable of saving blocked display-areas could be used.

Figure 9:
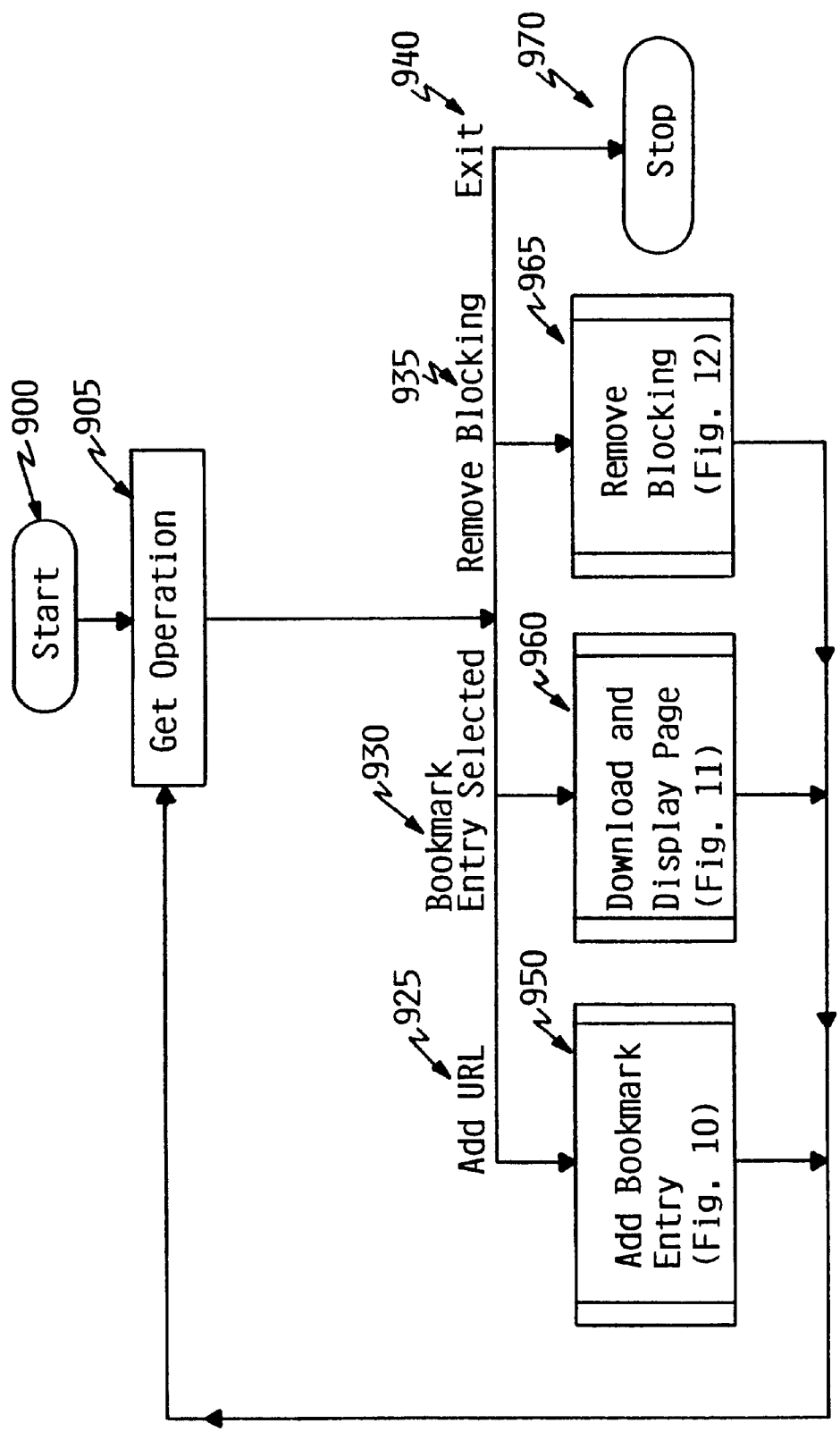
FIGS. 9, 10, 11, and 12 are flowcharts that describe the operation of the preferred embodiment.

FIGS. 9–12 illustrate flowcharts that describe the operation of the preferred embodiment. Referring to FIG. 9, there is illustrated the main logic of browser 399 that responds to requests from the user. At block 900, browser 399 starts. Control then continues to block 905, where browser 399 gets the next operation requested by the user and determines which operation the user requested.

The user can request to add an entry to the bookmark list 925, can select a bookmark entry for downloading 930, can remove blocking 935, and can exit 940. Browser 399 can perform many other functions—e.g., printing, copying, pasting, and viewing the source of pages—in addition to those shown in FIG. 9. These other functions are omitted for clarity of illustration.

If the user has requested that an entry in the bookmark list be added, then control continues to block 950 where the entry is added or as further described under the description for FIG. 10, below. The user can request this operation by selecting menu option 732, as previously described under the description for FIG. 7*a*. Referring again to FIG. 9, control then returns to block 905.

If the user requested that a bookmark entry be downloaded, then control continues to block 960 where browser 399 downloads, formats, and displays the page as further described under the description for FIG. 11, below. The user can request this operation by selecting one of the bookmarks in bookmark menu 730; for example menu option 740 or 742, as described above under the description for FIG. 7*a*. Referring again to FIG. 9, control then returns to block 905.

If the user requested that blocking of a previously blocked area be removed, then control continues to block 965 where browser 399 removes the blocking, as further described under the description for FIG. 12, below. The user can request this operation by selecting menu option 755 or 760, as described above under the description for FIG. 7*b*. Referring again to FIG. 9, control then returns to block 905.

If the user has requested an exit operation, then control stops at block 970.

Figure 10:
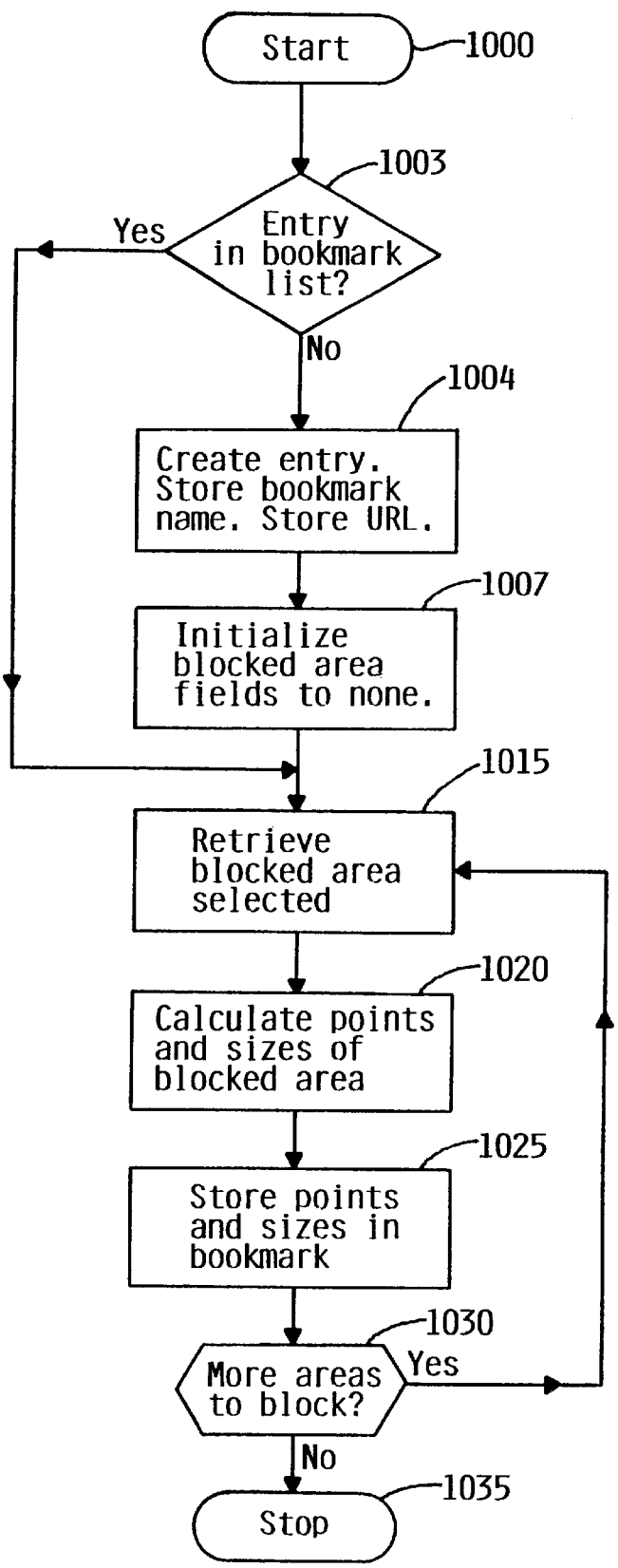

Referring to FIG. 10, there is illustrated sample logic that adds an entry in bookmark list 310. Control starts at block 1000. Control then continues to block 1003 where browser 399 determines whether there is a preexisting entry in bookmark list 310 for the URL that is to be added. If the determination at block 1003 is true, then control continues to block 1015, as described below. If the determination at block 1003 is false, then control then continues to block 1004 where browser 399 creates an entry in bookmark list 310, such as entry 811. Further, browser 399 stores a bookmark value in bookmark name field 812, which is a description of the page that the user finds meaningful, and stores an address of the page in URL field 814. Control then continues to block 1007 where browser 399 initializes the blocked area fields—such as blocked area 816 and blocked area 818—to none.

Control then continues to block 1015 where browser 399 retrieves a description of the area or areas that the user selected to be blocked. Control then continues to block 1020 where browser 399 calculates the starting points of the area on the screen and the size of the area on the screen that the user selected. In the preferred embodiment, browser 399 calculates the x and y coordinates to the upper left-hand corner of a rectangle that the user draws along with the height of the rectangle on the y-axis and the length of the rectangle on the x-axis. But, the user could also draw a circle, oval, square, or polygon. Control then continues to block 1025 where browser 399 stores these calculated values in the bookmark list, such as in blocked-area field 816. Control then continues to block 1030 where browser 399 determines whether there are more areas to block. If there are selected more areas to block, then control returns to block 1015. In this way browser 399 can add values to other blocked-area fields such as blocked-area field 818. When browser 399 has processed all of the areas, then the determination at block 1030 will be false and control continues to block 1035 where the function returns.

Figure 11:
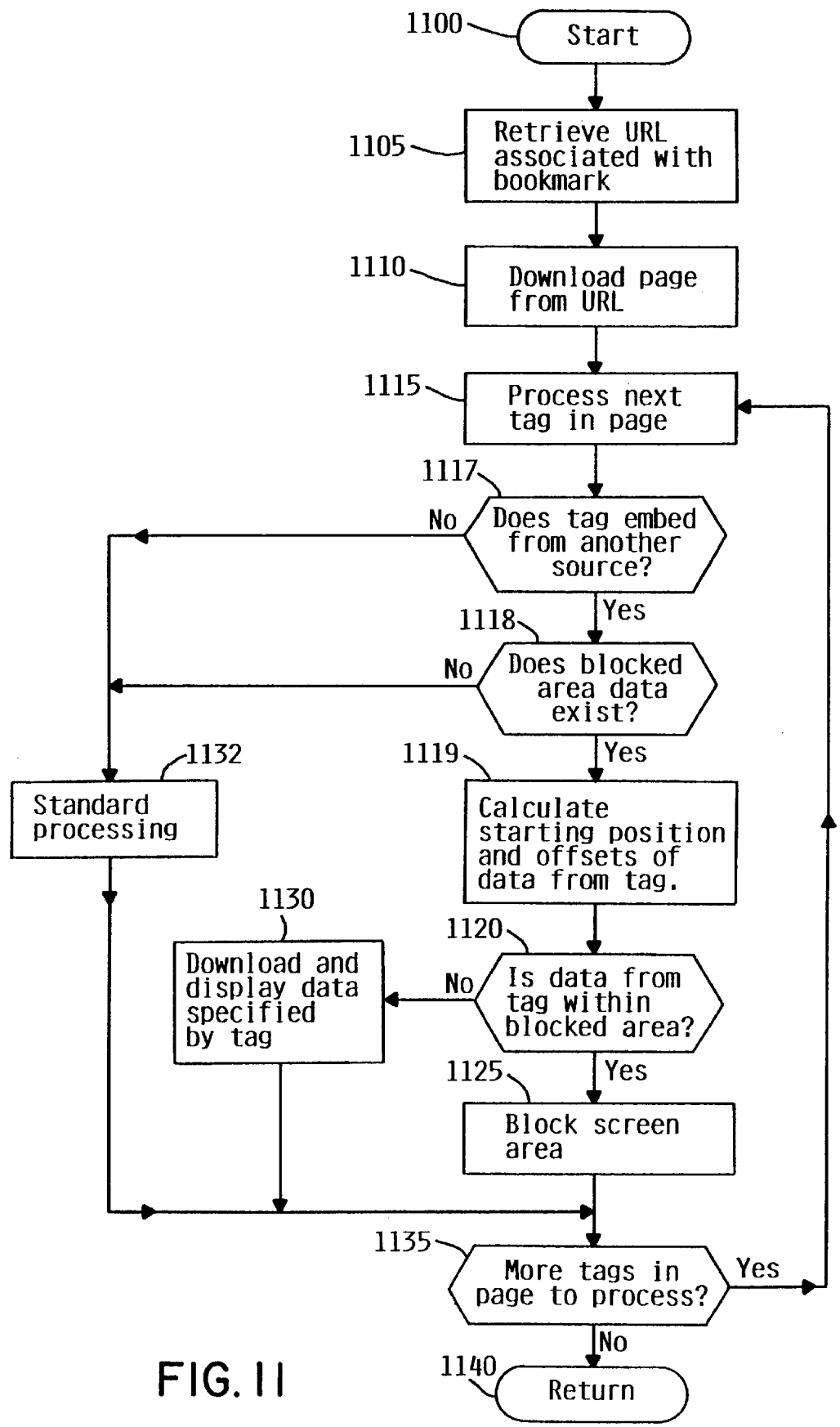

Referring to FIG. 11, there is illustrated sample logic that downloads and displays a specified page. At block 1100, the logic begins. Control then continues to block 1105, where browser 399 retrieves URL 814 associated with the bookmark name specified by the user. The user might have specified a bookmark name by selecting a bookmark name in menu control 730 in FIG. 7*a*. Referring again to FIG. 11, control then continues to block 1110 where browser 399 downloads the page associated with URL 814.

Control then continues to block 1115 where browser 399 begins processing the tags in the downloaded page, and retrieves the first tag in the page. Control then continues to block 1117 where browser 399 determines whether the tag embeds data from another source external to the downloaded page. Examples of tags that embed data from other sources are image tags, applet tags, and ActiveX control tags.

If this determination is false, then control continues to block 1132 where browser 399 performs the standard processing for this tag, and control then continues to block 1135 where browser 399 determines whether there are any more tags to be processed. If the determination at block 1135 is true, then control returns to block 1115 where browser 399 retrieves the next tag in the page.

If the determination at block 1117 is true, then control continues to block 1118 where browser 399 determines whether this bookmark entry 811 contains any blocked-area fields 816–818. If the determination at block 1118 is false then control continues to block 1132, as described above. If the determination at block 1118 is true, then control then continues to block 1119 where browser 399 interprets the tag in the page and calculates the starting position and offsets on display screen 114 where browser 399 will display the data associated with this tag. Control then continues to block 1120 where browser 399 determines whether the data to be displayed would fall within any of blocked-area fields 816–818 in bookmark entry 811 associated with this URL in bookmark list 310. If this determination is false, then control continues to block 1130 where browser 399 downloads the image specified by the tag, after which control continues to block 1135 as described above.

If the determination at block 1120 is true, then control continues to block 1125 where browser 399 blocks the screen area where this image would have been displayed had it been downloaded and processed. In the preferred embodiment, browser 399 displays an icon on the screen in place of the blocked image that indicates that the image has been blocked. This icon could be a rectangle with a cross through it. But, the browser could simply display empty space at this location. Control then continues to block 1135, as described above.

When the determination at block 1135 is false, then there are no tags left to process in the downloaded page, and control continues to block 1140 where the function returns.

Figure 12:
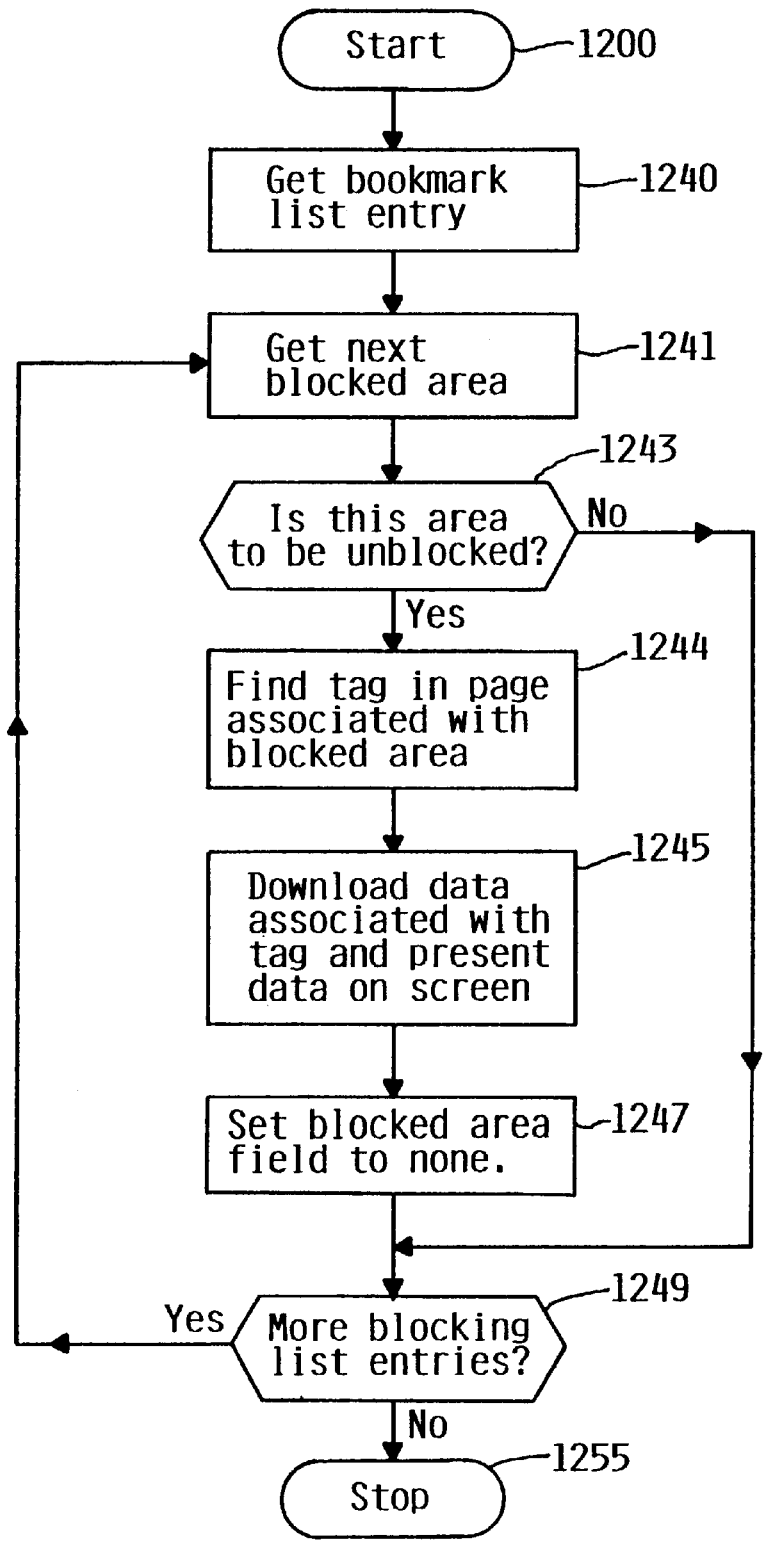

Referring to FIG. 12, there is illustrated sample logic that removes blocking from either one selected block area or from all blocked areas associated with a particular URL. Control begins at block 1200. Control then continues to block 1240 where browser 399 retrieves the bookmark list entry 811 associated with the current page. Control then continues to block 1241 where browser 399 gets the next blocked area in the bookmark list entry 811. Control then continues to block 1243 where browser 399 determines whether this blocked area is to be unblocked. If the user selected menu option 755 in FIG. 7b then the determination at block 1243 in FIG. 12 will be true for all blocked areas in bookmark list entry 811. If the user selected menu option 760 in FIG. 7b, then the determination at block 1243 in FIG. 12 will be true only for the areas that the user selected for unblocking. Referring again to FIG. 12, if the determination at block 1243 is false then control continues to block 1249 where browser 399 determines if there are any more blocked areas in bookmark entry 811. If the determination at block 1249 is false then the function returns at block 1255. If the determination at block 1249 is true then control returns to block 1241.

If the determination at block 1243 is true, then control continues to block 1244 where browser 399 finds the control tag in the page that is associated with this blocked area, that is, the tag that would display data within the blocked area. Control then continues to block 1245 where browser 399 downloads the data specified by this tag and presents the data on display screen 114. Control then continues to block 1247 where browser 399 sets the blocked-area field to none indicating that this area is not blocked. Control then continues to block 1249, as described above.

While this invention has been described with respect to the preferred and alternative embodiments, it will be understood by those skilled in the art that various changes in detail may be made therein without departing from the spirit, scope, and teaching of the invention. For example, browsers may become widely employed in consumer applications such as operator panels for consumer electronics, appliances, and automobiles. Accordingly, the herein disclosed invention is to be limited only as specified in the following claims.

What is claimed is:

1. An apparatus that browses a document, wherein the document contains a plurality of control tags, and wherein data is associated with the plurality of control tags, comprising:
   a processor;
   memory coupled to the processor;
   a blocked display-area list residing in the memory; and
   a browser residing in the memory and executed by the processor, wherein the browser:
   (a) interprets the plurality of control tags and formats the data to create a plurality of viewable objects displayed on a display-screen,
   (b) maps a user-selected display-screen area to a description of a display-screen area, said user-selected display screen area corresponding to a portion of a displayable image of said document,
   (c) saves the description of the display-screen area to the blocked display-area list,
   (d) after the browser subsequently retrieves the document again, the browser compares the saved display-screen area description in the blocked display-area list to locations on the display screen associated with the plurality of control tags contained in the document in order to identify at least one blocked viewable object defined by at least one control tag of said plurality of control tags, each said blocked viewable object being a viewable object of said plurality of viewable objects which is defined for display within said user-selected display-screen area, and
   (e) generates and displays a modified form of said document, wherein said modified form includes each respective viewable object which is not among said blocked viewable objects, and wherein said modified form does not include any viewable object which is among said blocked viewable objects.

2. The apparatus of claim 1, wherein the browser blocks the display of the viewable object by displaying a blank area on the display screen.

3. The apparatus of claim 1, wherein the browser blocks the display of the viewable object by substituting a blocking icon in place of the viewable object.

4. The apparatus of claim 1, wherein the browser operates at a client and downloads the document from a server, and wherein the associated data is contained in a file separate from the document, and when the browser blocks the display of the viewable object, the browser refrains from downloading the data associated with the blocked viewable object.

5. The apparatus of claim 1, wherein the blocked display-area list further comprises a bookmark list, and wherein the bookmark list further comprises an address of the document.

6. The apparatus of claim 1, wherein the browser further removes the description of the user-selected display-screen from the blocked display-area list in response to a user request.

7. A program product that browses a document, wherein the document contains a plurality of control tags, and wherein data is associated with the plurality of control tags, comprising:

a blocked display-area list;

a browser, wherein the browser:
- (a) interprets the plurality of control tags and formats the data to create a plurality of viewable objects displayed on a display-screen,
- (b) maps a user-selected display-screen area to a description of a display-screen area, said user-selected display screen area corresponding to a portion of a displayable image of said document,
- (c) saves the description of the display-screen area to the blocked display-area list,
- (d) after the browser subsequently retrieves the document again, the browser compares the saved display-screen area description in the blocked display-area list to locations on the display screen associated with the plurality of control tags contained in the document in order to identify at least one blocked viewable object defined by at least one control tag of said plurality of control tags, each said blocked viewable object being a viewable object of said plurality of viewable objects which is defined for display within said user-selected display-screen area, and
- (e) generates and displays a modified form of said document, wherein said modified form includes each respective viewable object which is not among said blocked viewable objects, and wherein said modified form does not include any viewable object which is among said blocked viewable objects; and signal-bearing media bearing the blocked display-area list and the browser.

8. The program product of claims 7, wherein the browser blocks the display of the viewable object by displaying a blank area on the display screen.

9. The program product of claim 7, wherein the browser blocks the display of the viewable object by substituting a blocking icon in place of the viewable object.

10. The program product of claim 7, wherein the browser operates at a client and downloads the document from a server, and wherein the associated data is contained in a file separate from the document, and when the browser blocks the display of the viewable object, the browser refrains from downloading the data associated with the blocked viewable object.

11. The program product of claim 7, wherein the blocked display-area list further comprises a bookmark list, and wherein the bookmark list further comprises an address of the document.

12. The program product of claim 7, wherein the browser further removes the description of the user-selected display-screen from the blocked display-area list in response to a user request.

13. A method for browsing a document, wherein the document contains a plurality of control tags, and wherein data is associated with the plurality of control tags, comprising the computer-executed steps of:

interpreting the plurality of control tags and formatting the data to create a plurality of viewable objects displayed on a display-screen;

mapping a user-selected display-screen area to a description of a display-screen area, said user-selected display screen area corresponding to a portion of a displayable image of said document, saving to a blocked display-area list the description of the display-screen area; and after subsequently retrieving the document again, performing the following steps:

comparing the saved display-screen area description in the blocked display-area list to locations on the display screen associated with the plurality of control tags contained in the document in order to identify blocked viewable objects defined by said plurality of control tags, said blocked viewable objects being viewable objects of said plurality of viewable objects which are displayed within said user-selected display-screen area, and generating and displaying a modified form of said document, wherein said modified form includes each viewable object which is not among said blocked viewable objects, and wherein said modified form does not include any viewable object which is among said blocked viewable objects.

14. The method of claim 13, wherein the blocking step blocks the display of the viewable object by displaying a blank area on the display screen.

15. The method of claim 13, wherein the blocking step blocks the display of the viewable object by substituting a blocking icon in place of the viewable object.

16. The method of claim 13, wherein the blocking step further comprises downloading the data in the data associated with the blocked viewable object, from a server.

17. The method of claim 13, wherein the blocked display-area list further comprises a bookmark list, and wherein the bookmark list further comprises an address of the document.

18. The method of claim 13, further comprising:

removing the description of the user-selected display-screen from the blocked display-area list in response to a user request.

19. A method for browsing and displaying an Internet document on a display screen, wherein the document contains a plurality of links to information, and the information is external to the document, comprising the computer-executed steps of:

mapping a user-selected display-screen area to a description of a blocked area, said user-selected display screen area corresponding to a portion of a displayable image of said Internet document;

saving the description of the blocked area in a blocked display-area list;

determining whether a first link is within the blocked area;

retrieving first information linked by the first link only if the first information is not within the blocked area; and displaying a modified form of said Internet document, said modified form being generated using information retrieved by said retrieving step.

20. The method of claim 19, further comprising:

displaying blank space in the blocked area.

21. The method of claim 19, further comprising:

displaying a blocking icon in the blocked area.

22. The method of claim 13, wherein the blocked display-area list is in a bookmark list.

* * * * *

UNITED STATES PATENT AND TRADEMARK OFFICE
CERTIFICATE OF CORRECTION

PATENT NO.    : 6,356,924 B2
DATED         : March 12, 2002
INVENTOR(S)   : Gary Lee Mullen-Schultz It is certified that error appears in the above-identified patent and that said Letters Patent is hereby corrected as shown below:

<u>Column 16,</u>
Line 28, replace "data associated with the blocked viewable object, from a server" with -- document, except for the data associated with the blocked viewable object, from a server --.

Signed and Sealed this

Third Day of September, 2002

Attest:

Attesting Officer

JAMES E. ROGAN
*Director of the United States Patent and Trademark Office*